(12) United States Patent
Magee

(10) Patent No.: US 6,317,030 B1
(45) Date of Patent: Nov. 13, 2001

(54) METHOD OF AND SYSTEM FOR CONDUCTING A HUNTING TOURNAMENT OR CONTEST UTILIZING PASSIVE TRANSPONDER IDENTIFICATION

(76) Inventor: Thomas M. Magee, 604 Broadway St., Emmetsburg, IA (US) 50536

( * ) Notice: Subject to any disclaimer, the term of this patent is extended or adjusted under 35 U.S.C. 154(b) by 0 days.

(21) Appl. No.: 09/225,027

(22) Filed: Jan. 4, 1999

(51) Int. Cl.[7] .................................................. H04Q 5/22
(52) U.S. Cl. .................... 340/10.52; 340/10.1; 340/10.6; 340/10.41; 340/10.42; 340/10.51; 340/573.3; 40/300; 128/299.01
(58) Field of Search .............................. 340/10.1, 10.42, 340/10.51, 10.41, 10.52, 10.6, 573.3; 40/300, 299.01; 128/899

(56) References Cited

U.S. PATENT DOCUMENTS

| | | | | |
|---|---|---|---|---|
| 3,336,530 | * | 8/1967 | Sloan | 342/386 |
| 4,854,328 | * | 8/1989 | Pollack | 340/573.3 |
| 5,074,318 | * | 12/1991 | Cambell et al. | 128/899 |
| 5,322,034 | * | 6/1994 | Willham et al. | 340/10.41 |
| 5,638,832 | * | 6/1997 | Singer et al. | 128/899 |
| 5,655,320 | * | 8/1997 | Kazenski | 40/300 |
| 6,006,460 | * | 12/1999 | Blackmer | 40/300 |

OTHER PUBLICATIONS

Pp. 1–2—The significance of patents for Transponder technologies by Transponder News.
Pp. 1–2—What are Transponders—by Transponder News.
Pp. 1–3—Radio Frequency Identification (RFID) Systems by Virginia Polytechnic Institute and State University.
Pp. 1–2—CWT FAQ—RFID Manufacturers—by Virginia Polytechnic Institute and State University.
Pp. 1–2 Implantable Biochips.
Pp. 1–2—Microchip Identification—by Allflex New Zealand Ltd.
Pp. 1–2—LID 500 Hand Hel Reader—by Trovan
1 Page—About the Technology—by Trovan
1 Page—Experience the trovan® Advantage—by Trovan.
Pp. 1–3—Trovan Readers—by Trovan.
Pp. 1–2 Trovan Transponders—by Trovan.

* cited by examiner

Primary Examiner—Brian Zimmerman
Assistant Examiner—Yves Dalencourt
(74) Attorney, Agent, or Firm—Henderson & Sturm LLP

(57) ABSTRACT

A method of and system for conducting a hunting tournament or contest. Passive transponders are inserted subcutaneously into the game to be harvested. Tagged animals are released back into their natural habitat. The hunting portion of the tournament is conducted. Animals harvested during the hunting tournament are brought in and scanned. The passive transponder, if present, responds to the scanning by transmitting an identification code. The code transmitted by the passive transponder is used to determine the prize the hunter is awarded. Hunter identification tags can be distributed to all participants in the hunting tournament and be used to tag the harvested animal. The passive transponder can be constructed to respond only to a particular scanning device.

12 Claims, 2 Drawing Sheets

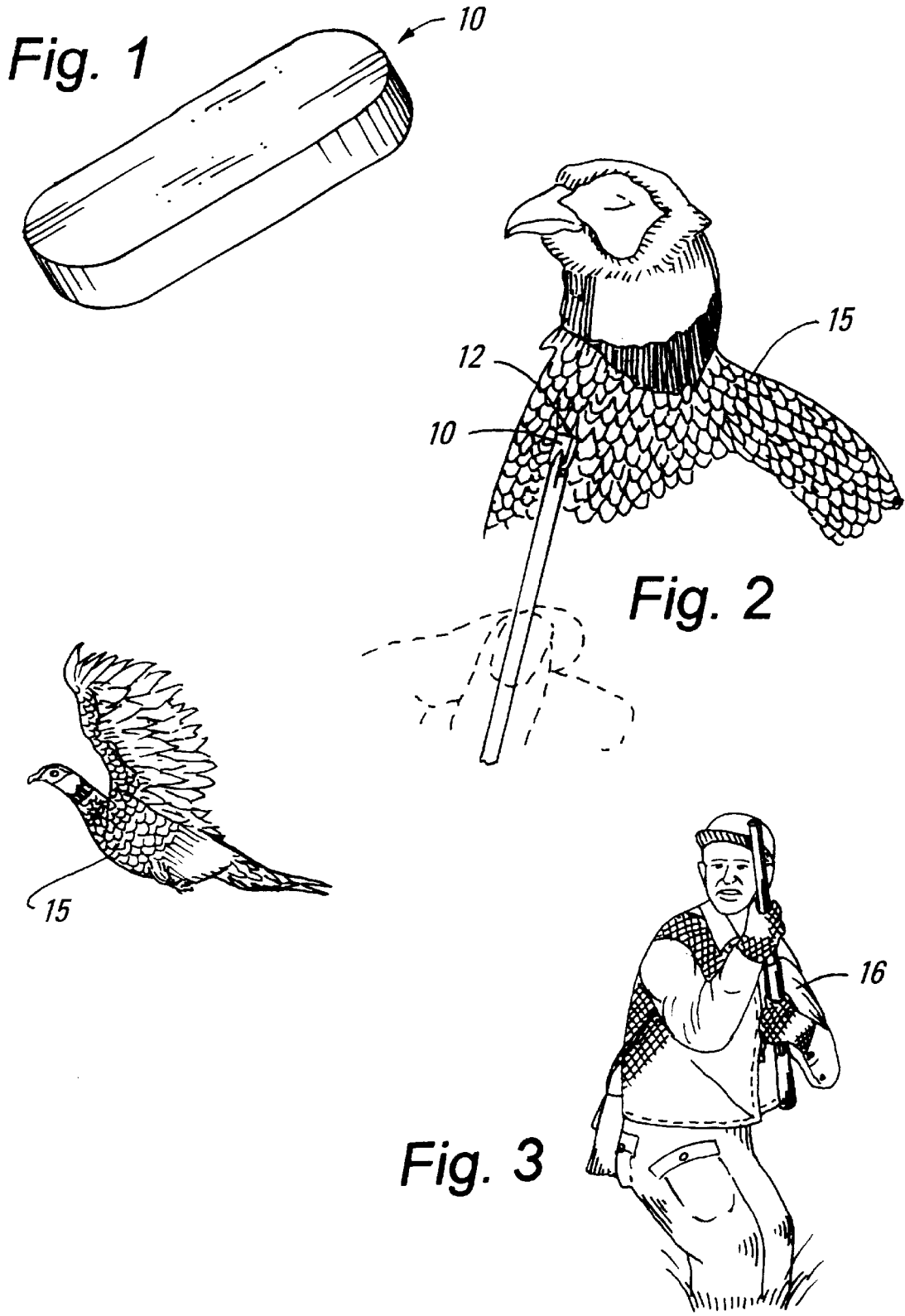

METHOD OF AND SYSTEM FOR CONDUCTING A HUNTING TOURNAMENT OR CONTEST UTILIZING PASSIVE TRANSPONDER IDENTIFICATION

BACKGROUND OF THE INVENTION

1. Field of the Invention

This invention relates generally to hunting tournaments and contests utilizing identification tagging and more particularly to utilizing passive transponders to tag game to be harvested and utilizing the passive transponders to award the hunting tournament prizes.

2. Description of the Related Art

Hunting tournaments and contests are conducted using a variety of formats and rules. Probably the most common format of a hunting tournament is to award prizes based on the size of the game harvested. For example, prizes in fishing tournaments are often based on the weight of the fish caught, either individually or cumulatively. In hunting for big game, such as deer, elk or the like, prizes are awarded based on size such as the weight of the animal or the size of the rack. Another format for conducting a hunting tournament used less frequently involves awarding prizes based on the particular animal harvested (caught, captured or killed). This type of tournament works especially well in fishing tournaments where a catch and release practice can be implemented.

In this latter type of tournament, animals are tagged and released back into their natural habitat. Tags used to mark the animals are visible tags and typically take the form of either a plastic tag attached to the animal's body or a plastic or metal band wrapped around a leg. If a hunter brings in an animal with a valid tag, a prize is awarded.

However, this system does not work as well in contests where the animal to be harvested must be killed during the hunting portion of the tournament. In this type of hunt, there is typically a limit to the number of animals an individual hunter may legally harvest. The use of a visible tag facilitates an environment wherein a hunter may harvest an animal, observe that there is no tag, and leave the animal in favor of the opportunity of harvesting an animal with a tag.

Another relevant consideration regarding the conducting of hunting tournaments and contests is the desire on the part of certain states and counties therein to encourage and increase hunting. States and counties are typically charged with wildlife management. Hunters perform a valuable service in helping to control the wildlife populations. If the population of a particular animal is low, regulations limiting the hunting of that animal can be implemented. This can be accomplished in ways such as limiting the length of the season, the number of animals that can be taken, the number of licenses that are issued, and the sex of the animal which a hunter may take. Adjusting these factors in an opposite manner can also be used to help reduce over-population as well.

However, using hunters to help control overpopulation presumes that the hunters are available. It is in this regard that tournaments and contests can be utilized to help encourage and increase hunting. An incentive to hunt is provided by awarding prizes to hunters that harvest particular animals. Even when there is an over-population, there is still a desire to conduct hunting under traditional standards. Poaching, the illegal harvesting of an animal, is not an acceptable practice. Thus, the use of external visible tags, which could encourage poaching, is not an optimal solution when a hunting contest requires that the animal be killed and has heretofore limited the viability of conducting hunts of these types.

Therefore, those concerned with these and other problems recognize the need for an improved method of and system for conducting hunting tournament and contests.

BRIEF SUMMARY OF THE INVENTION

This invention relates generally to hunting tournaments and contests utilizing identification tagging and more particularly to utilizing passive transponders to tag game to be harvested and utilizing the passive transponders to award the hunting tournament prizes. The present invention discloses using a passive transponder to tag an animal as part of a hunting tournament or contest. Animals to be hunted or harvested are tagged by inserting a passive transponder subcutaneously, including intramuscular, into the animal. The animal is then released into a natural habitat which is within the boundaries of where the hunting tournament will occur.

Hunters entered in the tournament are given hunter identification tags which are to be placed on animals harvested during the tournament. Typically, these tags will be long rectangular stickers which can be secured around the leg of a harvested animal. In a preferred embodiment, the hunter identification tag includes a bar code. Multiple hunter identification tags may be issued depending upon how many animals a hunter is allowed to harvest during the tournament.

During the proscribed times of the hunt, the hunters proceed to attempt to harvest animals. As animals are harvested, the hunters place the hunter identification tags on the animals. Tagged harvested animals are brought in by the hunters to be checked for passive transponders.

In a preferred embodiment, the passive transponder will only activate upon receiving a particular interrogation signal from a transponder reader associated with the hunting tournament. Still in a preferred embodiment, the transponder reader can also read and validate the bar code on the hunter identification tag.

Prizes for the hunting tournament are awarded to hunters bringing in game which include passive transponders. In a preferred embodiment, each passive transponder includes a unique identification code and prizes are awarded by matching specific identification codes to specific prizes.

Therefore, an object of the present invention is the provision of an improved method of and system for conducting a hunting tournament or contest.

Another object is to provide an improved method of and system for conducting a hunting tournament or contest which utilizes identification tags which are not visible to the hunter.

A further object is to provide an improved method of and system for conducting a hunting tournament or contest which utilizes passive transponders.

A still further object of the present invention is to provide an improved method of and system for conducting a hunting tournament or contest which encourages hunting and increase interest in hunting.

Another object of the present invention is to provide an improved method of and system for conducting a hunting tournament or contest which discourages the improper and illegal harvesting of game and encourages the proper harvesting of game.

A still further object is to provide an improved method of and system for conducting a hunting tournament or contest which awards specific prizes for the harvesting of specific animals.

Other objects, advantages, and novel features of the present invention will become apparent from the following detailed description of the invention when considered in conjunction with the accompanying drawings.

BRIEF DESCRIPTION OF THE SEVERAL VIEWS OF THE DRAWINGS

FIG. 1 is a perspective view of a passive transponder identification tag utilized in the method and system of the present invention;

FIG. 2 is a partial perspective view of a passive transponder being inserted subcutaneously into a bird;

FIG. 3 is a perspective view of a hunter attempting to harvest a bird during the tournament hunt;

DETAILED DESCRIPTION OF THE INVENTION

Figure 4:
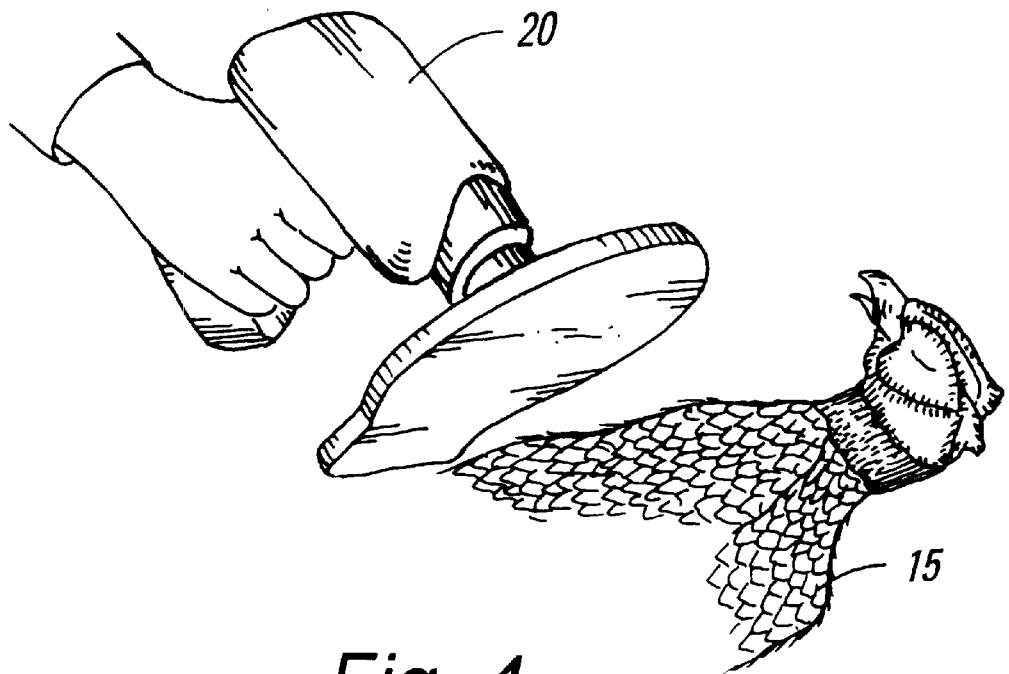
FIG. 4 is a partial perspective view of a harvested bird being checked for a passive transponder in accordance with the present invention.

Referring now to the drawings, wherein like reference numerals designate identical or corresponding parts throughout the several views, FIG. 1 shows a passive transponder (10) utilized in the method and system of the present invention. The transponder (10) of the present invention is an electronic circuit which responds to a radio frequency interrogation. The reply is a radio frequency signal which includes an identification code. Relative to each other, the interrogation signal is relatively strong whereas the reply signal from the transponder is weak. The passive aspect of the transponder is that it does not send a reply signal until receiving the interrogation signal.

While transponders have a variety of uses, the transponders used in the present invention are used for electronic identification. In a preferred embodiment of the present invention, the system utilizes an interrogator, also called a reader, which sends an interrogation signal for a limited time. When the transponder receives the signal, it waits until the interrogation transmission has completed and immediately responds. Utilizing this method, the weaker transmission of the transponder is not lost in the more powerful transmission of the reader.

The transponders of the present invention are micro transponders which are small enough to be inserted subcutaneously, including intramuscular, into an animal. Typically, these transponders are approximately 10 (ten) millimeters or less in length and only 1 (one) or 2 (two) millimeters wide. Transponders of this type have previously been used for identification of pets and zoo animals. The previous uses have been to identify lost animals and to deter theft.

Radio frequency identification (RFID) systems are manufactured by numerous companies. These companies include Destron Fearing Corporation, Avid and Trovan. The transponder systems by these companies include passive transponders designed for subcutaneous insertion into animals and are fundamentally appropriate for use in the present invention.

The system and method of the present invention utilizes the passive transponders (10) described above to tag animals to be hunted during a hunting tournament or contest. The passive transponders are subcutaneously inserted into the animal. The animals are then released into in the wild where hunters can attempt to harvest the animal. Because the transponder is inserted subcutaneously into the animal and the hunter doesn't know into which part of the animal the transponder was inserted, the hunter cannot easily determine if the harvested animal has an inserted transponder.

Referring to FIG. 2, a transponder (10) is shown being subcutaneously inserted into a pheasant (15) through an incision (12). While a pheasant (15) is shown, it should be understood that virtually any type of animal that is subject to being hunted could be used as game for a hunting tournament including all types of birds, fish, and deer, elk and the like. FIG. 3 shows a hunter (20) attempting to harvest the pheasant (15).

Obviously, the method and manner of hunting or harvesting game can vary greatly depending upon the type of game. Also, the method and manner may vary even for the same type of game. For instance, fishing is completely different than hunting with a shotgun. Furthermore, even within the realm of fishing the methods can vary. Fly fishing is significantly different from casting and reeling techniques. As another example, harvesting a deer may be accomplished with a bow and arrow, a shotgun, a muzzle-loader, or in a variety of other methods. The present invention takes into account all of these different manners and methods of harvesting game and it should be understood that all of the methods and manners are encompassed by the present invention.

In a preferred embodiment, the hunting tournament is conducted with individual hunters entering the contest. The hunters are given identification tags to place on harvested game. Typically these are rectangular stickers which can be wrapped around and secured to a harvested animal. Also in a preferred embodiment, these identification tags include a bar code. The bar code is unique to the hunter entered in the tournament and makes counterfeiting identification tags difficult.

Each hunter is given a quantity of identification tags equal to the maximum number of animals which can be harvested during the hunting tournament. In some circumstances this number might be one, in other circumstances the hunter may receive several tags.

Figure 5:
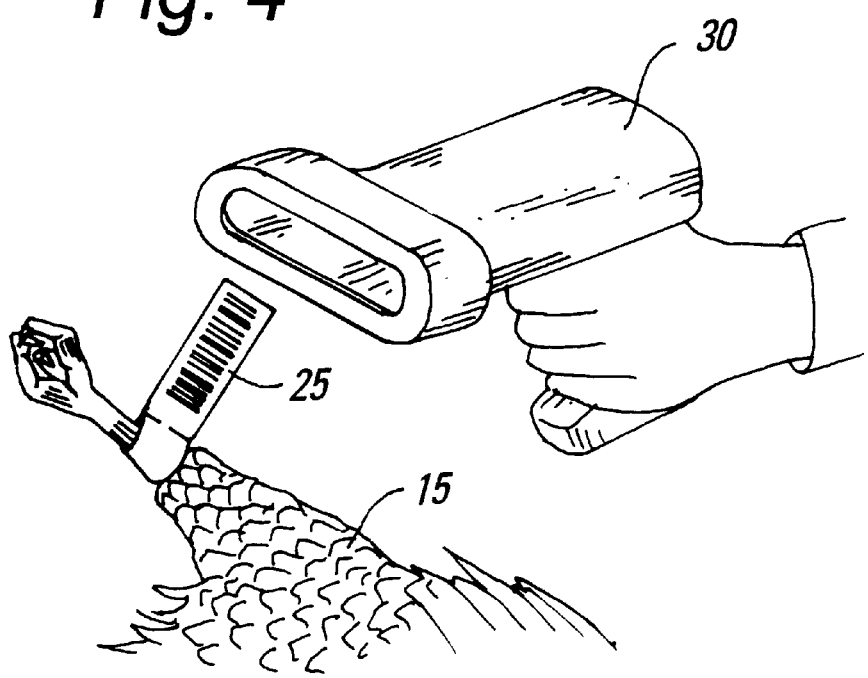
FIG. 5 is a partial perspective view of the identification tag attached to the harvested bird being scanned.

Each time a hunter harvests an animal, he secures one of his identification tags (25) to the animal (15). The hunter then submits his harvested animals to tournament officials such that they can be scanned for transponders (10). Only animals (15) with valid identification tags (25) are scanned for transponders (10). FIG. 5 shows an animal (15) being scanned for an appropriate identification tag (25) using a scanner (30). In this embodiment, the tag (25) includes a bar code and the scanner (30) is a bar code scanner.

FIG. 4 shows an animal (15) being scanned for a transponder (10, not shown) by a scanner (20). The scanner (20) sends out an interrogation signal which is received by the transponder (10). The transponder then responds by broadcasting a response signal. The response signal includes an identification code. In a preferred embodiment, each response identification code is unique. Therefore, no two harvested animals will transmit the same identification code.

In a tournament conducted in accordance with the present invention, prizes are awarded to hunters that bring in properly tagged harvested animals that have transponders (10). The prize the hunter is awarded is based upon the identification code transmitted by the transponder. Under this system, the hunter does not know whether he has won a prize and, if so, what the prize is until the game is scanned.

Universal scanners which are capable of scanning for a wide variety of transponder types are well known in the art and could effectively be utilized in the present invention. Additionally, in another embodiment, a customized scanner could be used which transmits a particular interrogation signal. The interrogation signal is selected based on its uniqueness with respect to the interrogation signals commonly used. The transponder (10) is designed to only respond to the particular interrogation signal of the scanner (20). In this manner, an additional level of security is provided to prevent circumventing the rules as applicable to the appropriate harvesting of animals. In one embodiment, the transponder (10) will only respond to a particular frequency or series of frequencies. In another embodiment, the transponder (10) will only respond to an interrogation which transmits a particular code. In these embodiments, hunters cannot use their own scanners to see if the harvested game includes a transponder.

In an alternative embodiment of the present invention, the scanner (20) and the scanner (30) are combined into the same hand-held device.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. A method of conducting a hunting tournament comprising the steps of:

tagging game to be hunted by injecting subcutaneously a transponder;

utilizing one or more identification codes programmed into said transponder;

releasing the game into an area designated for the hunting tournament;

utilizing hunters entered into said tournament;

harvesting the game according to tournament rules;

utilizing a tag reader to read the transponder inside harvested game; and awarding prizes according to the identification code read by said tag reader.

2. The method of claim 1 including the steps of:

issuing external tags to hunters entered into said tournament; and fastening an external tag to the harvested game prior to utilizing the tag reader to read the transponder.

3. The method of claim 1 including the step of:

utilizing transponders which only respond to a specific interrogation signal.

4. The method of claim 3 including the step of:

utilizing transponders which only respond to interrogations on a particular radio frequency.

5. The method of claim 3 including the step of:

utilizing transponders which only respond to interrogations utilizing a particular signal.

6. The method of claim 1 including the step of:

utilizing a unique identification code for each transponder.

7. A tagging and identification system for use in conducting a hunting tournament, comprising:

a plurality of transponders, wherein said transponders are inserted into game to be harvested during said hunting tournament;

a plurality of identification codes, wherein each identification code corresponds to a particular prize awarded in said hunting tournament;

wherein each transponder is programmed with one of said plurality of identification codes;

a transponder reader device;

wherein said transponder reader device includes means for interrogating said transponders;

wherein said transponders respond to an interrogation by transmitting said identification code;

wherein said reader device includes means for reading said transponder response; and means for awarding hunting tournament prizes based upon the read transponder response.

8. The tagging and identification system for use in conducting a hunting tournament of claim 7, including:

external tagging apparatuses, wherein said external tagging apparatuses are fastened to game harvested during the hunting tournament.

9. The tagging and identification system for use in conducting a hunting tournament of claim 7, including:

means associated with said transponders for only responding to a particular interrogation signal.

10. The tagging and identification system for use in conducting a hunting tournament of claim 9, including:

wherein said means associated with said transponders for only responding to a particular interrogation signal includes means for only responding to an interrogation signal on a specific radio frequency.

11. The tagging and identification system for use in conducting a hunting tournament of claim 9, including:

wherein said means associated with said transponders for only responding to a particular interrogation signal includes means for only responding to an interrogation signal broadcasting a particular signal.

12. The tagging and identification system for use in conducting a hunting tournament of claim 7, including:

wherein each of said plurality of transponders is programmed with a unique identification code.

* * * * *